United States Patent
Nagai et al.

(12)

(10) Patent No.: US 6,265,523 B1
(45) Date of Patent: Jul. 24, 2001

(54) PROCESSES FOR PRODUCING AROMATIC/ALIPHATIC COPOLYCARBONATE

(75) Inventors: Satoshi Nagai; Osamu Kondo; Shu Yoshida; Makoto Sasaki; Takashi Konishi; Takayasu Fujimori, all of Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/323,134

(22) Filed: Jun. 1, 1999

(30) Foreign Application Priority Data

| Jun. 1, 1998 | (JP) | 10-151609 |
| Jun. 3, 1998 | (JP) | 10-154462 |
| Jun. 4, 1998 | (JP) | 10-156055 |
| Jun. 12, 1998 | (JP) | 10-165201 |
| Jun. 18, 1998 | (JP) | 10-171412 |

(51) Int. Cl.$^7$ .................................................. C08G 63/04
(52) U.S. Cl. ............................................ 528/196; 528/198
(58) Field of Search ..................................... 528/196, 198

(56) References Cited

U.S. PATENT DOCUMENTS 5,026,817   6/1991   Sakashita et al. .................. 528/199

FOREIGN PATENT DOCUMENTS

| 0 787 756 A2 | 8/1997 | (EP) . |
| 10-120777 | 5/1998 | (JP) . |

*Primary Examiner*—Terressa M. Boykin
(74) *Attorney, Agent, or Firm*—Sughrue, Mion, Zinn, Macpeak & Seas, PLLC

(57) ABSTRACT

Processes for producing an aromatic/aliphatic copolycarbonate which has excellent impact resistance, excellent heat resistance, a high Abbe's number, a low photoelastic coefficient, and an excellent color tone. The processes include those in which: an aromatic/aliphatic copolycarbonate having a nitrogen content of 9 ppm or lower is produced from an aliphatic dihydroxy compound having a nitrogen content of 10 ppm or lower; an aromatic/aliphatic copolycarbonate is produced from an aliphatic dihydroxy compound having an iron content of 1 ppm or lower; an aromatic/aliphatic copolycarbonate is produced from an aliphatic dihydroxy compound having a content of aldehyde groups and/or formyl groups of 100 ppm or lower; an aromatic/aliphatic copolycarbonate is produced by subjecting an aromatic dihydroxy compound and an aliphatic dihydroxy compound having a content of free chlorine of 5 ppm or lower to polycondensation with heating and melting; and an aromatic/aliphatic copolycarbonate is produced from an aliphatic dihydroxy compound which has a melt Hazen unit of 40 or smaller after having been maintained at 260° C. for 5 hours in the air.

26 Claims, No Drawings

PROCESSES FOR PRODUCING AROMATIC/ALIPHATIC COPOLYCARBONATE

FIELD OF THE INVENTION

The present invention relates to processes for producing an aromatic/aliphatic copolycarbonate having impact resistance, a low photoelastic coefficient, a high refractive index, a high Abbe's number, excellent transparency, and excellent heat resistance. More particularly, this invention relates to processes for producing an aromatic/aliphatic copolycarbonate having an excellent color tone.

BACKGROUND OF THE INVENTION

Polycarbonate resins obtained by the interfacial polymerization of one or more aromatic dihydroxy compounds, e.g., bisphenol A, with phosgene in the presence of a proton acceptor are used as optical materials in applications such as various lenses, prisms, and optical-disk substrates because these resins are excellent not only in mechanical properties including impact resistance but in heat resistance and transparency.

However, the polycarbonate produced from bisphenol A as only the aromatic dihydroxy compound has the following drawbacks.

Since the polycarbonate has a high photoelastic coefficient and relatively poor melt flowability, it gives molded articles having enhanced birefringence and an Abbe's number as low as 30 although the refractive index thereof is high, i.e., 1.58. Namely, the performances of the polycarbonate are insufficient for wide use in applications such as photorecording materials and optical lenses.

For the purpose of eliminating the above drawbacks of bisphenol A polycarbonate, the present inventors previously proposed an aromatic/aliphatic copolycarbonate resin (JP-A-10-120777; the term "JP-A" used herein means an unexaminied and published Japanese patent application). This aromatic/aliphatic copolycarbonate resin has excellent impact resistance and heat resistance, a low photoelastic coefficient, and a high Abbe's number and can hence be extensively used as an optical material. For producing such an aromatic/aliphatic copolycarbonate, the method known as a transesterification process is advantageously used because it is difficult to produce the polymer by the ordinary phosgene process. In the transesterification process, an aromatic dihydroxy compound, an aliphatic dihydroxy compound, and a carbonic diester, e.g., diphenyl carbonate, are subjected in a molten state to polycondensation through transesterification reactions.

In the transesterification reaction for polycarbonate production, polycondensation is usually conducted while heating the reaction mixture at a temperature of from 200 to 330° C. The polymer being yielded is thus exposed to such a high temperature for a prolonged time period. Because of this heat history, the polymer yielded has an impaired color tone and other deteriorations. Namely, the prior art process has a drawback that a polymer of excellent quality is difficult to obtain. Consequently, the polycarbonate obtained by the transesterification process is unsuitable for use in fields where a satisfactory color tone is required.

SUMMARY OF THE INVENTION

The present invention has been made to overcome the above-described problems accompanying prior art techniques.

Accordingly, an object of the present invention is to provide process for producing an aromatic/aliphatic copolycarbonate having excellent impact resistance, excellent heat resistance, a high Abbe's number, a low photoelastic coefficient, and an excellent color tone.

The copolycarbonate resin obtained by the process of the present invention comprises constituent units derived from an aromatic dihydroxy compound represented by the following formula (1), constituent units derived from an aliphatic dihydroxy compound represented by the following formula (2), and constituent units derived from a carbonic diester.

(1)

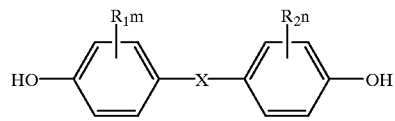

(In formula (1), X is

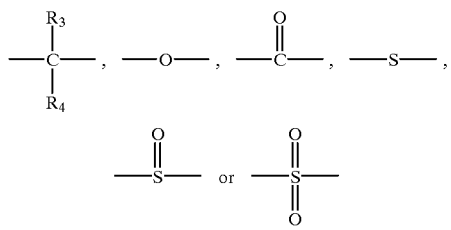

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and m and n, which each indicates the number of substituents, each is an integer of 0 to 4.)

(2)

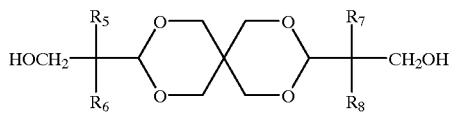

(In formula (2), $R_5$, $R_6$, $R_7$, and $R_8$ each is a hydrogen atom or a univalent alkyl group having 1 to 10 carbon atoms.)

The present inventors made intensive studies in order to accomplish the above object. As a result, they have found that the color tone of an aromatic/aliphatic copolycarbonate has a correlation with the nitrogen content, iron content, aldehyde group and/or formyl group content, free-chlorine content of the aliphatic dihydroxy compound used or a melt Hazen unit of the aliphatic dihydroxy compound which has been maintained at a specific temperature for a specific time period. It has also been found that a resin having a satisfactory color tone is obtained by using such a specific aliphatic dihydroxy compound. The present invention has been completed based on those findings.

According to a first embodiment of the present invention, there is provided a process for producing an aromatic/aliphatic copolycarbonate which has a nitrogen content of 9 ppm or lower, which comprises subjecting an aromatic dihydroxy compound represented by the formula (1) described above, an aliphatic dihydroxy compound represented by the formula (2) described above, and a carbonic diester to polycondensation under heating and melting, wherein the aliphatic dihydroxy compound having a nitrogen content of 10 ppm or lower is used.

According to a second embodiment of the present invention, there is provided a process for producing an aromatic/aliphatic copolycarbonate, which comprises subjecting an aromatic dihydroxy compound represented by the formula (1), an aliphatic dihydroxy compound represented by the formula (2), and the carbonic diester to polycondensation under heating and melting, wherein the aliphatic dihydroxy compound having an iron content of 1 ppm or lower, preferably 0.5 ppm or lower, and more preferably 0.2 ppm or lower, is used.

According to a third embodiment of the present invention, there is provided a process for producing an aromatic/aliphatic copolycarbonate, which comprises subjecting an aromatic dihydroxy compound represented by the formula (1), an aliphatic dihydroxy compound represented by the formula (2), and the carbonic diester to polycondensation under heating and melting, wherein the aliphatic dihydroxy compound having a content of aldehyde groups and/or formyl groups of 100 ppm or lower is used.

According to a fourth embodiment of the present invention, there is provided a process for producing an aromatic/aliphatic copolycarbonate, which comprises subjecting an aromatic dihydroxy compound represented by the formula (1), an aliphatic dihydroxy compound represented by the formula (2), and the carbonic diester to polycondensation under heating and melting, the aliphatic dihydroxy compound having a content of free chlorine of 5 ppm or lower is used.

According to a fifth embodiment of the present invention, there is provided a process for producing an aromatic/aliphatic copolycarbonate, which comprises subjecting an aromatic dihydroxy compound represented by the formula (1), an aliphatic dihydroxy compound represented by the formula (2), and the carbonic diester to polycondensation under heating and melting, the aliphatic dihydroxy compound which has a melt Hazen unit of 40 or smaller, preferably 20 or smaller, and more preferably 15 or smaller, after having been maintained at 260° C. for 5 hours in the air is used.

DETAILED DESCRIPTION OF THE INVENTION

The processes for producing an aromatic/aliphatic copolycarbonate according to the present invention will be explained in detail below.

The copolycarbonate obtained by process of the present invention comprises constituent units derived from an aromatic dihydroxy compound represented by the formula (1) described above, constituent units derived from an aliphatic dihydroxy compound represented by the formula (2) described above, and constituent units derived from a carbonic diester.

Examples of the aromatic dihydroxy compound which can be used include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, and 4,4'-dihydroxy-3,3'-dimethyldiphenyl sulfone.

Of these, 2,2-bis(4-hydroxyphenyl)propane (i.e., bisphenol A), and 1,1-bis(4-hydroxyphenyl)cyclohexane are particularly preferably used.

Examples of the aliphatic dihydroxy compound which can be used include 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5]undecane, 3,9-bis(2-hydroxy-1,1-diethylethyl)-2,4,8,10-tetraoxaspiro[5.5]undecane, and 3,9-bis(2-hydroxy-1,1-dipropylethyl)-2,4,8,10-tetraoxaspiro[5.5]undecane. Preferred of these is 3,9-bis(2-hydroxy-1,1-dimethylethyl)-2,4,8,10-tetraoxaspiro[5.5]undecane.

The process according to the first embodiment of the present invention is characterized in that the aliphatic dihydroxy compound represented by the formula (2) is one which has been purified so as to have a nitrogen content of 10 ppm or lower.

The aliphatic dihydroxy compound represented by the formula (2) described above is generally synthesized by an acid-catalyzed reaction of one or two hydroxyaldehydes with pentaerythritol as represented by the following reaction formula (3). Examples of the acid catalyst generally used include mineral acids such as hydrochloric acid, phosphoric acid and nitric acid, and organic acids such as p-toluenesulfonic acid and methanesulfonic acid.

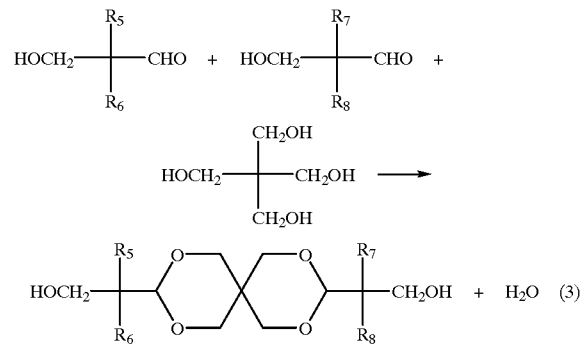

(In the reaction formula (3), $R_5$, $R_6$, $R_7$, and $R_8$ each is a hydrogen atom or a univalent alkyl group having 1 to 10 carbon atoms.)

One of the hydroxyaldehydes shown in the reaction formula (3) is synthesized by a cross aldol condensation of an aliphatic aldehyde with formaldehyde as shown by the following reaction formula (4). This condensation proceeds in the presence of either an acid or an alkaline catalyst. However, where a mineral acid such as hydrochloric acid, phosphoric acid, sulfuric acid, or nitric acid or an organic acid such as p-toluenesulfonic acid or methanesulfonic acid is used, the hydroxyaldehyde may polymerize to form a dimer or tetramer. Because of this, an inorganic base such as sodium hydroxide, potassium hydroxide, or potassium carbonate or an organic base such as triethylamine or pyridine is generally used frequently. Especially for industrial production, triethylamine is advantageously used from the standpoints of yield, purity, etc.

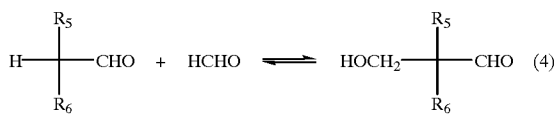

(In the reaction formula (4), $R_5$ and $R_6$ each is a hydrogen atom or a univalent alkyl group having 1 to 10 carbon atoms. The hydroxyaldehyde containing $R_7$ and $R_8$ in place of $R_5$ and $R_6$ can be synthesized in the same manner as in the reaction formula (4).)

Hydroxyaldehydes polymerize to form dimers and tetramers and are hence relatively unstable monomers. Because of this and because of their use as the reaction intermediate, these monomers frequently are not purified in industrial processes before being subjected to the following synthesis step. Namely, a hydroxyaldehyde which has been synthesized with an amine catalyst and contains the amine catalyst remaining therein is used in the following step. Consequently, the aliphatic dihydroxy compound obtained by the reaction shown by the reaction formula (3) contains the amine compound. This problem of amine remaining can be avoided by synthesizing a dihydroxyaldehyde using a catalyst which is not an amine, or by purifying a crude dihydroxyaldehyde and then subjecting the purified aldehyde to the synthesis of an aliphatic dihydroxy compound.

In producing such an aliphatic dihydroxy compound having a nitrogen content not higher than the specific value, purification techniques such as distillation and recrystallization are effective. However, an especially effective method in the present invention is to dissolve the crude aliphatic dihydroxy compound in a solvent with heating and then cool the solution to recrystallize the dihydroxy compound. This recrystallization method is more effective when it includes a step in which nitrogen-containing impurities are removed by adsorption or by washing with water.

Preferred solvents for recrystallization for use in the present invention are those in which the aliphatic dihydroxy compound has a sufficiently high solubility at high temperatures and a sufficiently low solubility at around room temperature. More preferred are those which have, besides the above property, the ability to remove nitrogen-containing impurities from the dihydroxy compound through the recrystallization operation. Examples of the solvents having such properties include alcohols,. ethers, esters, ketones, and aromatic hydrocarbons.

Specific examples of the above solvents are as follows.

Examples of the alcohol solvents include methanol, ethanol, n-propanol, isopropanol, n-butanol, isobutanol, 2-butanol, tert-butanol, 1-pentanol, 2-methyl-1-butanol, isoamyl alcohol, hexyl alcohol, heptyl alcohol, octyl alcohol, capryl alcohol, nonyl alcohol, decyl alcohol, undecyl alcohol, lauryl alcohol, allyl alcohol, crotyl alcohol, propargyl alcohol, cyclopentanol, cyclohexanol, 2-methoxyethanol, 2-ethoxyethanol, 2-butoxyethanol, and ethylene glycol.

Examples of the ether solvents include diethyl ether, dipropyl ether, diisopropyl ether, dibutyl ether, diisobutyl ether, di-n-amyl ether, diisoamyl ether, methyl butyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether, diallyl ether, ethyl allyl ether, anisole, phenetole, diphenyl ether, dibenzyl ether, tetrahydrofuran, 1,4-dioxane, ethylene glycol dimethyl ether, ethylene glycol diethyl ether, and ethylene glycol dibutyl ether.

Examples of the ester solvents include ethyl acetate, isobutyl acetate, n-butyl acetate, isobutyl acetate, n-amyl acetate, isoamyl acetate, methyl propionate, ethyl propionate, propyl propionate, isopropyl propionate, butyl propionate, isobutyl propionate, n-amyl propionate, isoamyl propionate, methyl butyrate, ethyl butyrate, propyl butyrate, isopropyl butyrate, butyl butyrate, isobutyl butyrate, n-amyl butyrate, isoamyl butyrate, methyl isobutyrate, ethyl isobutyrate, propyl isobutyrate, isopropyl isobutyrate, isobutyl isobutyrate, isoamyl isobutyrate, methyl valerate, ethyl valerate, propyl valerate, butyl valerate, n-amyl valerate, isoamyl valerate, methyl isovalerate, ethyl isovalerate, propyl isovalerate, isopropyl isovalerate, isobutyl isovalerate, isoamyl isovalerate, methyl benzoate, and ethyl benzoate.

Examples of the ketone solvents include acetone, methyl ethyl ketone, isopropyl methyl ketone, butyl methyl ketone, isobutyl methyl ketone, pinacolone, diethyl ketone, butyrone, diisopropyl ketone, methyl vinyl ketone, mesityl oxide, methylheptenone, cyclobutanone, and cyclohexanone.

Examples of the aromatic hydrocarbon compounds include benzene, toluene, xylene, and mesitylene.

Especially preferred solvents for recrystallization among those are alcohols. More preferred are the alcohols having 1 to 10 carbon atoms. A mixture of two or more of the above solvents may be used.

Where the recrystallization operation includes a step in which the solvent for recrystallization containing the aliphatic dihydroxy compound dissolved therein is washed with water with heating, it is necessary to select, among the above-described solvents for recrystallization, an organic solvent which separates from water after having been mixed therewith. Although such a poorly water-miscible organic solvent may be selected from organic solvents such as alcohols, ethers, esters, ketones, and aromatic hydrocarbons, especially preferred organic solvents include alcohols having 4 to 10 carbon atoms.

Examples of the alcohol solvents include n-butyl alcohol, isobutyl alcohol, sec-butyl alcohol, tert-butyl alcohol, n-amyl alcohol, 2-pentyl alcohol, 3-pentyl alcohol, isoamyl alcohol, 2-methyl-1-butanol, 3-methyl-2-butanol, neopentyl alcohol, tert-pentyl alcohol, hexyl alcohol, heptyl alcohol, octyl alcohol, capryl alcohol, nonyl alcohol, decyl alcohol, cyclopentanol, and cyclohexanol. Especially preferred solvents among these are n-butyl alcohol, isobutyl alcohol, n-amyl alcohol, and isoamyl alcohol.

The recrystallization can be carried out by conventional method. The recrystallization operation may be conducted two or more times according to the material purity, etc. The crystals obtained by the recrystallization are recovered by filtration, washed, subsequently dried in an appropriate manner, and then used as a starting material for the target resin.

A further diminution of nitrogen-containing impurities can be attained by incorporating into the recrystallization process a step in which the solution is brought into contact with an adsorbent. Namely, the aliphatic dihydroxy compound is dissolved in a solvent and the resulting solution is brought into contact with an adsorbent. This step can be advantageously conducted either by a batch method comprising adding an adsorbent to the solution and stirring the mixture or by a flow method comprising passing the solution through an adsorbent layer packed in a column.

Preferred examples of the adsorbent include activated carbon, alumina, silica, and zeolites. Especially preferred is activated carbon.

After the adsorption treatment, the adsorbent is completely removed from the solution by filtration, etc., and the filtrate is subjected to the recrystallization in an ordinary manner to thereby obtain crystals of the aliphatic dihydroxy compound.

A further reduction in nitrogen content can be attained by incorporating into the recrystallization process a step in which the solvent for recrystallization containing the aliphatic dihydroxy compound dissolved therein is washed with water with heating. This step can advantageously be conducted either by the batch method or by a continuous method using, e.g., a combination of a mixer and a settler.

The washing step may be conducted in such a manner that the aliphatic dihydroxy compound is dissolved in an organic solvent with heating and this solution is brought into contact with water with heating. Alternatively, the washing step may be conducted in such a manner that the aliphatic dihydroxy compound is mixed with an organic solvent and water and this mixture is heated to a given temperature to dissolve the dihydroxy compound and wash the solution.

The larger the number of repetitions of water washing, the lower the nitrogen content of the aliphatic dihydroxy compound. However, the smaller the number of repetitions of water washing, the more preferred from the standpoint of profitability.

It is also effective to wash the solvent for recrystallization containing the aliphatic dihydroxy compound dissolved therein with an aqueous solution containing a pH regulator, a reducing agent, or an oxidizing agent.

Examples of basic compounds that are used in the case of washing with an alkaline aqueous solution include lithium hydroxide, sodium hydroxide, potassium hydroxide, barium hydroxide, sodium carbonate, potassium carbonate, sodium hydrogen carbonate, potassium hydrogen carbonate, lithium tetraborate, sodium tetraborate, potassium tetraborate, and ammonia. Especially preferred basic compounds among these are potassium carbonate and potassium hydrogen carbonate.

Examples of acid compounds that are used in the case of washing with an acid aqueous solution include hydrofluoric acid, hydrochloric acid, hydrobromic acid, sulfuric acid, nitric acid, phosphoric acid, boric acid, p-toluenesulfonic acid, and methanesulfonic acid. A preferred acid compound among these is boric acid.

Examples of the reducing substance include sodium hydrosulfite, sodium sulfite, potassium sulfite, lithium hydrogen sulfite, sodium hydrogen sulfite, potassium hydrogen sulfite, lithium nitrite, sodium nitrite, potassium nitrite, lithium thiosulfate, sodium thiosulfate, and potassium thiosulfate. A preferred reducing substance is sodium hydrosulfite. Although the aqueous treatment solution containing sodium hydrosulfite may have a pH in either an acid or an alkaline range, washing with the solution is more effective when the solution is alkaline. It is preferred to use sodium hydrosulfite in combination with a basic compound such as lithium hydroxide, sodium hydroxide, potassium hydroxide, barium hydroxide, sodium carbonate, potassium carbonate, sodium hydrogen carbonate, potassium hydrogen carbonate, lithium tetraborate, sodium tetraborate, potassium tetraborate, or ammonia. Preferred basic compounds for use in combination with sodium hydrosulfite include lithium hydroxide, sodium hydroxide, and potassium hydroxide.

Examples of the oxidizing substance include hydrogen peroxide, sodium percarbonate, potassium percarbonate, sodium perborate, potassium perborate, sodium hypochlorite, potassium hypochlorite, sodium chlorite, potassium chlorite, sodium chlorate, potassium chlorate, lithium chlorate, sodium perchlorate, potassium perchlorate, lithium perchlorate, sodium permanganate, potassium permanganate, sodium manganate, potassium manganate, sodium persulfate, potassium persulfate, potassium dichromate, and potassium chromate. Preferred of these oxidizing substances is hydrogen peroxide. When hydrogen peroxide is used, the aqueous solution may be neutral. It is however preferred to use hydrogen peroxide in combination with a basic compound such as lithium hydroxide, sodium hydroxide, potassium hydroxide, barium hydroxide, sodium carbonate, potassium carbonate, sodium hydrogen carbonate, potassium hydrogen carbonate, lithium tetraborate, sodium tetraborate, potassium tetraborate, or ammonia or with an acid compound such as hydrofluoric acid, hydrochloric acid, hydrobromic acid, sulfuric acid, nitric acid, phosphoric acid, boric acid, p-toluenesulfonic acid, or methanesulfonic acid. Especially preferred pH regulators include boric acid.

After an aqueous solution containing any of those pH regulators, reducing agents, and oxidizing agents is used to wash an organic solvent containing the aliphatic dihydroxy compound, the resulting washed solution should be washed with water at least once because the added pH regulator, reducing agent, or oxidizing agent remaining in the solution is problematic. Consequently, washing with water is conducted preferably from 1 to 10 times, more preferably from 2 to 5 times.

The process according to the second embodiment of the present invention is characterized in that the aliphatic dihydroxy compound represented by the formula (2) is one which has been regulated so as to have an iron content of 1 ppm or lower.

The aliphatic dihydroxy compound represented by the formula (2) described above is generally produced from one or two aldehydes and pentaerythritol by the conventional acetalization reaction represented by reaction formula (3) described above. Any desired strong acid can be used as a catalyst for the acetalization. Preferred as the strong acid are sulfuric acid and p-toluenesulfonic acid. Each of the aldehydes shown in the formula (3) can be easily synthesized from the corresponding aldehyde and formaldehyde through the reaction shown by the reaction formula (4) described above. This reaction can be conducted by a conventional method.

The main and minor starting materials for use in these reactions are ones containing substantially no iron, and the process equipment including the tank and piping is prevented from causing contamination with iron. Thus, the target aliphatic dihydroxy compound having an iron content of 1 ppm or lower can be obtained.

However, some of commercial products of the dihydroxy compound contain a considerable amount of iron as an impurity. The present inventors made intensive studies on methods for reducing the iron content of such a commercial product. As a result, they have found that a substantially iron-free aliphatic dihydroxy compound is obtained by dissolving the iron-containing aliphatic dihydroxy compound in a solvent with heating, filtering the solution in a hot state through a filter having an appropriate opening diameter, and then cooling the filtrate solution to cause recrystallization.

Preferred solvents for recrystallization for use in the process according to the second aspect of the present invention are those in which the aliphatic dihydroxy compound has a sufficiently high solubility at high temperatures and a sufficiently low solubility at around room temperature. More preferred are those which have, besides the above property, the ability to remove any ingredient causative of resin coloring from the dihydroxy compound through the recrystallization operation. Examples of the solvents having such properties include alcohols, ethers, esters, ketones, and aromatic hydrocarbons.

Specific examples of such solvents include the same compounds as those enumerated hereinabove with regard to the first embodiment of the invention.

Especially preferred solvents for recrystallization among those are alcohols. More preferred are the alcohols having 1 to 10 carbon atoms. A mixture of two or more of those solvents may be used.

The crude aliphatic dihydroxy compound represented by the formula (2) is dissolved in a solvent with heating and the solution in a hot state is filtered through a filter. The opening diameter of the filter is preferably 1 $\mu$m or smaller, more preferably 0.5 $\mu$m or smaller, and most preferably 0.1 $\mu$m or smaller. If a filter having an opening diameter larger than 1 $\mu$m is used, fine foreign particles containing iron cannot be sufficiently removed and the desired iron content cannot be attained. The filter is preferably made of a material which neither dissolves nor swells nor undergoes another undesirable change in the hot solvent. Examples of the material include acetates, polyethersulfones, polytetrafluoroethylene, nylons, nonwoven polyester fabrics coated with cellulose acetate, polypropylene, filter paper, filter paper made of glass fibers, stainless steel, and sintered metals. An appropriate material selected from these may be used. It is also possible to use two or more filter media arranged in series in order of decreasing opening diameter. Either a reduced or an elevated pressure may be used for the filtration. During the filtration, the temperature of the hot solution being filtered is regulated so as to be slightly higher than the crystallization temperature to thereby prevent crystals from precipitating during the filtration to cause filter clogging.

From the filtrate solution resulting from the hot filtration, crystals of the aliphatic dihydroxy compound are precipitated by cooling. The crystals obtained are separated from the solution by filtration, rinsed if necessary with a solvent, and dried to remove the solvent. Thus, the aliphatic dihydroxy compound having a low iron content can be obtained. If desired and necessary, the recrystallization operation may be conducted two or more times, whereby the aliphatic dihydroxy compound having an even higher purity can be obtained.

In the present invention, the recrystallization process may include a step in which the solution is brought into contact with an adsorbent. Namely, the aliphatic dihydroxy compound is dissolved in a solvent and the resultant solution is brought into contact with an adsorbent. This step can be advantageously conducted either by the batch method comprising adding an adsorbent to the solution and stirring the mixture or by the flow method comprising passing the solution through an adsorbent layer packed in a column.

Preferred examples of the adsorbent include activated carbon, alumina, silica, and zeolites. Especially preferred is activated carbon.

After the adsorption treatment, the adsorbent is completely removed from the solution by filtration through the filter described above, and the filtrate is subjected to the recrystallization in an ordinary manner to thereby obtain crystals of the aliphatic dihydroxy compound.

The process according to the third aspect of the present invention is characterized in that the aliphatic dihydroxy compound represented by the formula (2) is one which has been purified so as to have a content of aldehyde groups and/or formyl groups of 100 ppm or lower.

Purification techniques effective in producing the aliphatic dihydroxy compound having a content of aldehyde groups and/or formyl groups not higher than the specific value include distillation, sublimation, washing with an oxidizing agent, washing with a reducing agent, hydrogenation, treatment with an adsorbent, and recrystallization. A combination of two or more of these purification techniques is more effective. Especially effective purification methods in the present invention are: a method which comprises dissolving the crude aliphatic dihydroxy compound in a water-immiscible organic solvent with heating, adding an aqueous solution of an oxidizing agent or reducing agent thereto, stirring the mixture with heating to wash the organic-solvent solution, subsequently sufficiently washing the organic-solvent solution with ion-exchanged water, and then cooling the solution to cause recrystallization; and a method which comprises dissolving the crude aliphatic dihydroxy compound in a solvent, hydrogenating the dissolved compound in the presence of a known metal or metal oxide catalyst for hydrogenation at ordinary or an elevated pressure, and then cooling the solution to cause recrystallization.

Preferred solvents for use in the present invention are those in which the aliphatic dihydroxy compound has a sufficiently high solubility at high temperatures and a sufficiently low solubility at around room temperature. For example, in the case where washing with an oxidizing agent and recrystallization are conducted in combination, preferred solvents include water-immiscible alcohols, water-immiscible esters, water-immiscible ketones, and aromatic hydrocarbons which each is unsusceptible to oxidation. Where washing with a reducing agent and recrystallization are conducted in combination, preferred solvents include water-immiscible alcohols, water-immiscible esters, water-immiscible ethers, and aromatic hydrocarbons which each is unsusceptible to reduction. Where hydrogenation and recrystallization are conducted in combination, preferred solvents include alcohols and ethers.

Specific examples thereof are as follows. Examples of the water-immiscible alcohol solvents include n-butanol, isobutyl alcohol, 2-butanol, tert-butanol, 1-pentanol, 2-methyl-1-butanol, isoamyl alcohol, hexyl alcohol, heptyl alcohol, octyl alcohol, capryl alcohol, nonyl alcohol, decyl alcohol, undecyl alcohol, lauryl alcohol, allyl alcohol, crotyl alcohol, propargyl alcohol, cyclopentanol, cyclohexanol, and 2-butoxyethanol.

Examples of the water-immiscible ether solvents include diethyl ether, dipropyl ether, diisopropyl ether, dibutyl ether, diisobutyl ether, di-n-amyl ether, diisoamyl ether, methyl butyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether, diallyl ether, ethyl allyl ether, anisole, phenetole, diphenyl ether, dibenzyl ether, ethylene glycol dimethyl ether, ethylene glycol diethyl ether, and ethylene glycol dibutyl ether.

Examples of the water-immiscible ester solvents include ethyl acetate, isobutyl acetate, n-butyl acetate, isobutyl acetate, n-amyl acetate, isoamyl acetate, methyl propionate, ethyl propionate, propyl propionate, isopropyl propionate, butyl propionate, isobutyl propionate, n-amyl propionate, isoamyl propionate, methyl butyrate, ethyl butyrate, propyl butyrate, isopropyl butyrate, butyl butyrate, isobutyl butyrate, n-amyl butyrate, isoamyl butyrate, methyl isobutyrate, ethyl isobutyrate, propyl isobutyrate, isopropyl isobutyrate, isobutyl isobutyrate, isoamyl isobutyrate, methyl valerate, ethyl valerate, propyl valerate, butyl valerate, n-amyl valerate, isoamyl valerate, methyl isovalerate, ethyl isovalerate, propyl isovalerate, isopropyl isovalerate, isobutyl isovalerate, isoamyl isovalerate, methyl benzoate, and ethyl benzoate.

Examples of the water-immiscible ketone solvents include butyl methyl ketone, isobutyl methyl ketone, pinacolone, diisopropyl ketone, mesityl oxide, and cyclohexanone.

Examples of the aromatic hydrocarbon compounds include benzene, toluene, xylene, and mesitylene.

Examples of the alcohol solvents for use in hydrogenation include methanol, ethanol, 1-propanol, 2-propanol, 2-methoxyethanol, 2-ethoxyethanol, and ethylene glycol, besides the water-immiscible alcohols enumerated above.

Examples of the ether solvents for use in hydrogenation include tetrahydrofuran and dioxane, besides the water-immiscible ethers enumerated above.

Especially preferred solvents among those are alcohols. More preferred are the alcohols having 1 to 10 carbon atoms. A mixture of two or more of the above solvents may be used.

The recrystallization can be carried out by a conventional method. The recrystallization operation may be conducted two or more times according to the material purity, etc. The crystals obtained by the recrystallization are recovered by filtration, washed, subsequently dried in an appropriate manner, and then used as a starting material for the target resin.

The process according to the fourth embodiment of the present invention is characterized in that the aliphatic dihydroxy compound represented by the formula (2) is one which has been purified so as to have a content of free chlorine of 5 ppm or lower.

Purification techniques effective in producing the aliphatic dihydroxy compound having a content of free chlorine not higher than the specific value include distillation and recrystallization. However, an especially effective purification method in the present invention is to dissolve the crude aliphatic dihydroxy compound in a solvent with heating and then cool the solution to recrystallize the dihydroxy compound. This recrystallization method is more effective when it includes a step in which free chlorine is removed by washing with water.

Preferred solvents for recrystallization for use in the present invention are those in which the aliphatic dihydroxy compound has a sufficiently high solubility at high temperatures and a sufficiently low solubility at around room temperature. More preferred are those which have, besides the above property, the ability to remove free chlorine through the recrystallization operation. Examples of the solvents having such properties include alcohols, ethers, esters, ketones, and aromatic hydrocarbons.

Specific examples of such solvents include the same compounds as those described hereinabove with regard to the first embodiment of the invention.

Especially preferred solvents for recrystallization among those are alcohols. More preferred are the alcohols having 1 to 10 carbon atoms. A mixture of two or more of those solvents may be used.

Where the recrystallization operation includes a step in which the solvent for recrystallization containing the aliphatic dihydroxy compound dissolved therein is washed with water with heating, it is necessary to select, among the above-described solvents for recrystallization, an organic solvent which separates from water after having been mixed therewith. Although such a poorly water-miscible organic solvent may be selected from organic solvents such as alcohols, ethers, esters, ketones, and aromatic hydrocarbons, especially preferred organic solvents include alcohols having 4 to 10 carbon atoms.

Examples of the alcohol solvents include n-butyl alcohol, isobutyl alcohol, sec-butyl alcohol, tert-butyl alcohol, n-amyl alcohol, 2-pentyl alcohol, 3-pentyl alcohol, isoamyl alcohol, 2-methyl-1-butanol, 3-methyl-2-butanol, neopentyl alcohol, tert-pentyl alcohol, hexyl alcohol, heptyl alcohol, octyl alcohol, capryl alcohol, nonyl alcohol, decyl alcohol, cyclopentanol, and cyclohexanol. Especially preferred solvents among these are n-butyl alcohol, isobutyl alcohol, n-amyl alcohol, and isoamyl alcohol.

The recrystallization can be carried out by a conventional method. The recrystallization operation may be conducted two or more times according to the material purity, etc. The crystals obtained by the recrystallization are recovered by filtration, washed, subsequently dried in an appropriate manner, and then used as a starting material for the target resin.

A further diminution of free chlorine can be attained by incorporating into the recrystallization process a step in which the solvent for recrystallization containing the aliphatic dihydroxy compound dissolved therein is washed with water with heating. This step can be advantageously conducted either by the batch method or by a continuous method employing, e.g., a combination of a mixer and a settler.

The washing step may be conducted in such a manner that the aliphatic dihydroxy compound is dissolved in an organic solvent with heating and this solution is brought into contact with water with heating. Alternatively, the washing step may be conducted in such a manner that the aliphatic dihydroxy compound is mixed with an organic solvent and water and this mixture is heated to a given temperature to dissolve the dihydroxy compound and wash the solution.

The larger the number of repetitions of water washing, the lower the content of free chlorine in the aliphatic dihydroxy compound. However, the smaller the number of repetitions of water washing, the more preferred from the standpoint of profitability.

It is also possible to wash the solvent for recrystallization containing the aliphatic dihydroxy compound dissolved therein with an aqueous solution containing a pH regulator, a reducing agent, or an oxidizing agent.

The process according to the fifth embodiment of the present invention is characterized in that the aliphatic dihydroxy compound represented by the formula (2) is one which has been purified so as to have a melt Hazen unit of 40 or smaller after having been maintained at 260° C. for 5 hours in the air.

Purification techniques effective in producing the aliphatic dihydroxy compound having a melt Hazen unit not larger than the specific value include distillation and recrystallization. However, an especially effective purification method in the present invention is to dissolve the crude aliphatic dihydroxy compound in a solvent with heating and then cool the solution to recrystallize the dihydroxy compound. This recrystallization method is more effective when it includes a step in which substances causative of coloring are adsorptively removed.

Preferred solvents for recrystallization for use in the present invention are those in which the aliphatic dihydroxy compound has a sufficiently high solubility at high temperatures and a sufficiently low solubility at around room temperature. More preferred are those which have, besides the above property, the ability to remove any ingredient causative of resin coloring from the dihydroxy compound through the recrystallization operation. Examples of the solvents having such properties include alcohols, ethers, esters, ketones, and aromatic hydrocarbons.

Specific examples of such solvents include the same compounds as those described hereinabove with regard to the first embodiment of the invention.

Especially preferred solvents for recrystallization among those are alcohols. More preferred are the alcohols having 1 to 10 carbon atoms. A mixture of two or more of those solvents may be used.

The recrystallization can be carried out by a conventional method. The recrystallization operation may be conducted two or more times according to the material purity, etc. The crystals obtained by the recrystallization are recovered by filtration, washed, subsequently dried in an appropriate manner, and then used as a starting material for the target resin.

A further improvement in melt Hazen unit can be attained by incorporating into the recrystallization process a step in which the solution is brought into contact with an adsorbent. Namely, the aliphatic dihydroxy compound is dissolved in a solvent and the resultant solution is brought into contact with an adsorbent. This step can be advantageously conducted either by a batch method comprising adding an adsorbent to the solution and stirring the mixture or by a flow method comprising passing the solution through an adsorbent layer packed in a column.

Preferred examples of the adsorbent include activated carbon, alumina, silica, and zeolites. Especially preferred is activated carbon.

After the adsorption treatment, the adsorbent is completely removed from the solution by filtration, etc., and the solution is then subjected to the recrystallization in an ordinary manner to thereby obtain crystals of the aliphatic dihydroxy compound.

The copolycarbonate resin obtained by the process according to the present invention includes: a random, block, or alternative copolymer comprising constituent units derived from an aromatic dihydroxy compound represented by the formula (1) described above and constituent units derived from an aliphatic dihydroxy compound represented by the formula (2) described above; a blend of a polycarbonate comprising constituent units derived from an aromatic dihydroxy compound represented by the formula (1) with a polycarbonate comprising constituent units derived from an aliphatic dihydroxy compound represented by the formula (2); and the like. Because of this, the polycarbonate resin is characterized by excellent heat resistance, an excellent hue, a balanced combination of refractive index and dispersion characteristics, and reduced birefringence.

In the copolycarbonate obasined by the process according to the present invention, the constituent units derived from the aromatic dihydroxy compound (hereinafter, these units are referred to as "I") and the constituent units derived from the aliphatic dihydroxy compound (hereinafter, these units are referred to as "II") are contained in such a proportion that the I/II molar ratio is preferably from 90/10 to 10/90, and more preferably from 80/20 to 20/80. If the molar ratio of the constituent units derived from the aromatic dihydroxy compound to those derived from the aliphatic dihydroxy compound (I/II) in the polycarbonate is lower than 10/90, the resin has poor heat resistance. If the molar ratio thereof exceeds 90/10, the resin has too large values of photoelastic coefficient, water absorption, etc., and a poor balance between refractive index and Abbe's number. Such properties are undesirable for optical materials.

Examples of the carbonic diester for use in the present invention include diphenyl carbonate, ditolyl carbonate, bis(chlorophenyl) carbonate, m-cresyl carbonate, dinaphthyl carbonate, dimethyl carbonate, diethyl carbonate, dibutyl carbonate, and dicyclohexyl carbonate. Especially preferred of these is diphenyl carbonate. Diphenyl carbonate is used in an amount of preferably from 0.97 to 1.2 moles, and more preferably from 0.99 to 1.10 moles, per mole of the sum of the aromatic dihydroxy compound and the aliphatic dihydroxy compound.

The weight average molecular weight of the polycarbonate resin obtained by the process of the present invention is preferably from 30,000 to 200,000, and more preferably from 50,000 to 120,000.

A basic compound is used as a catalyst in the polycarbonate production processes according to the present invention. Examples of the basic compound include compounds of alkali metals and/or alkaline earth metals and nitrogen compounds.

Preferred examples of such compounds include salts of organic or inorganic acids with alkali metals or alkaline earth metals, oxides, hydroxides, hydrides, or alkoxides of alkali metals or alkaline earth metals, quaternary ammonium hydroxides and salts thereof, and amines. These compounds can be used alone or in combination of two or more thereof.

Examples of such alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenyl borate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salt, dipotassium salt, disecium salt, and dilithium salt of bisphenol A, and the sodium salt, potassium salt, cesium salt, and lithium salt of phenol.

Examples of the compounds of alkaline earth metals include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium acetate, calcium acetate, strontium acetate, barium acetate, magnesium stearate, calcium stearate, calcium benzoate, and magnesium phenyl phosphate.

Examples of the nitrogen compounds include ammonium hydroxides having groups selected from alkyl, aryl, alaryl, and similar groups, such as tetramethylammonium hydroxide, tetraethylammonium hydroxide, tetrapropylammonium hydroxide, tetrabutylammonium hydroxide, and trimethylbenzylammonium hydroxide; tertiary amines such as triethylamine, dimethylbenzylamine, and triphenylamine; secondary amines such as diethylamine and dibutylamine; primary amines such as propylamine and butylamine; imidazole derivatives such as 2-methylimidazole and 2-phenylimidazole; ammonia; and basic salts such as tetramethylammonium borohydride, tetrabutylammonium tetraphenylborate, and tetraphenylammonium tetraphenylborate.

These catalysts are used in an amount of from $10^{-9}$ to $10^{-3}$ mol, preferably from $10^{-7}$ to $10^{-5}$ mol, per mole of the sum of the aromatic dihydroxy compound and the aliphatic dihydroxy compound.

The transesterification reactions according to the present invention can be carried out by a conventional method for melt polycondensation. Namely, using the starting materials described above and a catalyst, transesterification reactions are conducted with heating at ordinary or a reduced pressure. Melt polycondensation is thus performed while removing by-products. In general, the reactions are carried out in two or more stages.

Specifically, the first-stage reaction is conducted at a temperature of from 120 to 260° C., and preferably from 180 to 240° C., for a period of from 0 to 5 hours, and preferably from 0.5 to 3 hours. Subsequently, reactions among the aromatic dihydroxy compound, aliphatic dihydroxy compound, and carbonic diester are conducted at an elevated temperature while reducing the pressure of the reaction system. The polycondensation reactions in the final stage are conducted at a pressure of 1 mmHg or lower and a temperature of from 200 to 300° C. These reactions may be performed either continuously or batchwise. For carrying out the reactions described above, either a vessel type reactor or an extrusion type reactor may be used.

The catalyst remaining in the copolycarbonate as the final polymerization product in the present invention is preferably removed therefrom or deactivated so as to enable the copolycarbonate to retain thermal stability and hydrolytic stability. A preferred method for deactivating the transesterification catalyst, such as an alkali metal or alkaline earth metal catalyst, is to add a known acid substance. Examples of the acid substance include aromatic sulfonic acids such as p-toluenesulfonic acid, esters of aromatic sulfonic acids, such as butyl p-toluenesulfonate and hexyl p-toluenesulfonate, organic halides such as stearoyl chloride, butyryl chloride, benzoyl chloride, and p-toluenesulfonyl chloride, alkylsulfuric acids such as dimethylsulfuric acid, organic halides such as benzyl chloride, and inorganic acids such as boric acid and phosphoric acid.

After the catalyst deactivation, a step may be conducted in which low-boiling compounds remaining in the polymer are removed by degassing the polymer at a pressure of from 0.1 to 1 mmHg and a temperature of from 200 to 300° C. Suitable for use in this step is a horizontal type apparatus equipped with one or more stirring blades excellent in surface renewal, such as paddle blades, lattice blades, or spectacle blades, or a thin-film evaporator.

Besides the agent for enhancing thermal and hydrolytic stability, other additives can be added in the present invention, such as, e.g., an antioxidant, pigment, dye, reinforcement, filler, ultraviolet absorber, lubricant, release agent, nucleating agent, plasticizer, flowability improver, and antistatic agent.

These additives can be incorporated into the copolycarbonate resin by conventional methods. For example, a method is suitably selected in which the additive ingredients and the resin are homogeneously mixed together by means of a high-speed mixer represented by a tumbling mixer, Henschel mixer, ribbon blender, or supermixer and the resultant mixture is melt-kneaded with an extruder, Banbury mixer, roll mill, or the like.

The copolycarbonate resin obtained by the process of the present invention has been improved in balance between refractive index and dispersion characteristics and in photoelastic coefficient and other properties while retaining the excellent properties of polycarbonates, such as impact resistance and heat resistance. Therefore, the copolycarbonate resin can be advantageously used as a plastic optical material for various lenses, prisms, optical-disk substrates, and the like.

The present invention will be explained below in detail by reference to the following Examples, but the invention should not be construed as being limited to the following Examples in any way.

Although various methods can be used for determining the nitrogen content of an aliphatic dihydroxy compound, a simple method is to burn a sample and determine the amount of the nitrogen oxides contained in the combustion gas. Among commercial total nitrogen analyzers based on chemiluminescence is TN-10, manufactured by Mitsubishi Chemical Corp. This apparatus was used for determining the nitrogen contents of aliphatic dihydroxy compounds.

The determination of iron was conducted by subjecting a given amount of an aliphatic dihydroxy compound to wet combustion (sulfuric acid, nitric acid) by means of an automatic wet-combustion apparatus and then analyzing the residue by ICP emission spectroscopy.

The determination of aldehyde groups and formyl groups was conducted by a method comprising dissolving a given amount of an aliphatic dihydroxy compound and a given amount of trioxane as an internal standard substance in deuterated dimethyl sulfoxide, analyzing the solution with a 500 MHz NMR spectrometer to obtain a $^1$H-NMR spectrum, and calculating the content of aldehyde and formyl groups from the ratio of the integrated peak intensities of those groups to that of the internal standard substance. The chemical shift for aldehyde groups is 9.47 to 9.49 ppm, and that for formyl groups is 8.23 to 8.25 ppm.

The content of free chlorine in an aliphatic dihydroxy compound was determined with ion chromatograph Type 2000i, manufactured by Dionex Corp.

Melt Hazen unit was determined by the method described in JIS K-4101. An aliphatic dihydroxy compound was completely melted at a given temperature, and the melt was heated to a given temperature and then held at this temperature for a given time period. The melt Hazen unit thereof was then measured.

EXAMPLE 1

In 10 liters of methanol was completely dissolved 800 g of commercial 3,3'-bis(2-hydroxy-1,1-dimethylethyl)-2,4,8,10-tetraoxaspiro[5.5]undecane (hereinafter referred to as spiroglycol) at 60° C. This solution was cooled to room temperature to recrystallize the spiroglycol. The crystals were taken out by filtration, rinsed with an almost equivolume of methanol, and then dried with a vacuum dryer at 60° C. to obtain 560 g of crystals. These crystals had a nitrogen content of 8.5 ppm.

Into a 300 cc four-necked flask equipped with a stirrer and a distiller were introduced 22.8 g (0.10 mol) of 2,2-bis(4-hydroxyphenyl)propane, 30.4 g (0.10 mol) of the purified spiroglycol obtained above, 43.3 g (0.202 mol) of diphenyl carbonate, and $6.0 \times 10^{-7}$ mol of sodium hydrogen carbonate. In a nitrogen atmosphere, the contents were heated to 180° C. and stirred for 30 minutes.

Thereafter, the degree of vacuum was regulated to 150 mmHg and, simultaneously therewith, the reaction mixture was heated to 200° C. at a rate of 60° C./hr to conduct transesterification reactions. The reaction mixture was further heated to 260° C. and held at this temperature for 10 minutes and the internal pressure was then reduced to 1 mmHg or lower over 1 hour, while the resulting phenol was maintained being distilled off. Reactions were thus conducted with stirring for 6 hours in total. After completion of the reactions, nitrogen was introduced into the reaction vessel to return the internal pressure to ordinary pressure, and the copolycarbonate yielded was taken out. Properties of this copolycarbonate are shown in Table 1.

EXAMPLE 2

Isobutanol was used in place of methanol as a solvent for spiroglycol recrystallization. In 10 liters of isobutanol was completely dissolved 800 g of spiroglycol at 90° C. This solution was cooled to room temperature to recrystallize the spiroglycol. The crystals were taken out by filtration, rinsed with an almost equivolume of isobutanol, and then vacuum-dried at 80° C. to obtain 700 g of spiroglycol crystals. The purified spiroglycol obtained had a nitrogen content of 9.1 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1.

EXAMPLE 3

2-Ethoxyethanol was used in place of methanol as a solvent for spiroglycol recrystallization. In 10 liters of 2-ethoxyethanol was completely dissolved 800 g of spiroglycol at 90° C. This solution was cooled to room temperature to recrystallize the spiroglycol. The crystals were taken out by filtration, rinsed with an almost equivolume of 2-ethoxyethanol, and then vacuum-dried at 80° C. to obtain 720 g of spiroglycol crystals. The purified spiroglycol obtained had a nitrogen content of 6.8 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1.

EXAMPLE 4

In 10 liters of 2-ethoxyethanol was completely dissolved 800 g of spiroglycol at 90° C. This solution was passed through a commercial activated-carbon cartridge filter (TCC-W1, manufactured by Advantec Toyo Co.) and then cooled to room temperature to recrystallize the spiroglycol. The crystals were taken out by filtration, and the resultant cake was rinsed with an almost equivolume of 2-ethoxyethanol and then dried with a vacuum dryer at 80° C. to obtain 720 g of crystals. The purified spiroglycol obtained had a nitrogen content of 2.6 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1.

EXAMPLE 5

In a mixture of 10 liters of isobutyl alcohol, 8.75 kg of water, and 5.6 g of boric acid was completely dissolved 875 g of commercial spiroglycol with stirring at 75° C. This mixture was stirred at 75° C. for 1 hour and the stirring was then stopped, upon which the mixture separated into two layers. The aqueous layer was discharged in an amount of 6.78 kg. To the residue were added 3.75 kg of 75° C. water and 0.1 g of potassium carbonate. This mixture was stirred for 15 minutes and the stirring was then stopped, upon which it separated into two layers. The aqueous layer was discharged in an amount of 4.03 kg. To the residue was added 3.75 kg of 75° C. water. This mixture was stirred for 15 minutes and the stirring was then stopped, upon which it separated into two layers. The aqueous layer was discharged in an amount of 4.12 kg. To the residue was added 3.75 kg of 75° C. water. This mixture was stirred for 15 minutes and the stirring was then stopped, upon which it separated into two layers. The aqueous layer was discharged in an amount of 4.13 kg. Furthermore, 3.75 kg of 75° C. water was added to the residue. This mixture was stirred for 15 minutes and the stirring was then stopped, upon which it separated into two layers. The aqueous layer was discharged, which amounted to 4.19 kg. The residual organic layer was filtered through a 5C filter paper and then cooled to room temperature to recrystallize the spiroglycol. The crystals were separated from the solution with a Nutsche funnel, rinsed with 1 liter of isobutyl alcohol, and then vacuum-dried in a vacuum dryer at 60° C. to obtain 688 g of purified spiroglycol. The spiroglycol obtained had a nitrogen content of 3.1 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1.

EXAMPLE 6

In a mixture of 10 liters of isobutyl alcohol, 8.75 kg of water, 4.43 g of sodium hydrosulfite, and 4.40 g of potassium hydroxide was completely dissolved 875 g of commercial spiroglycol with stirring at 75° C. This mixture was stirred at 75° C. for 1 hour and the stirring was then stopped, upon which the mixture separated into two layers. The aqueous layer was discharged in an amount of 6.78 kg. To the residue was added 3.75 kg of 75° C. water. This mixture was stirred for 15 minutes and the stirring was then stopped, upon which it separated into two layers. The aqueous layer was discharged in an amount of 4.22 kg. To the residue was added 3.75 kg of 75° C. water. This mixture was stirred for 15 minutes and the stirring was then stopped, upon which it separated into two layers. The aqueous layer was discharged in an amount of 4.15 kg. Furthermore, 3.75 kg of 75° C. water was added to the residue. This mixture was stirred for 15 minutes and the stirring was then stopped, upon which it separated into two layers. The aqueous layer was discharged, which amounted to 4.09 kg. The residual organic layer was filtered through a 5C filter paper and then cooled to room temperature to recrystallize the spiroglycol. The crystals were separated from the solution with a Nutsche funnel, rinsed with 1 liter of isobutyl alcohol, and then vacuum-dried in a vacuum dryer at 60° C. to obtain 688 g of purified spiroglycol. The spiroglycol obtained had a nitrogen content of 2.9 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1.

COMPARATIVE EXAMPLE 1

The same procedure as in Example 1 was conducted, except that the commercial spiroglycol was used without being purified. This spiroglycol had a nitrogen content of 43.5 ppm. The copolycarbonate obtained had a very poor color tone.

COMPARATIVE EXAMPLE 2

2-Ethoxyethyl acetate was used in place of methanol as a solvent for spiroglycol recrystallization. In 10 liters of 2-ethoxyethyl acetate was completely dissolved 800 g of spiroglycol at 90° C. This solution was cooled to room temperature to recrystallize the spiroglycol. The crystals were taken out by filtration, rinsed with an almost equivolume of 2-ethoxyethyl acetate, and then vacuum-dried at 80° C. to obtain 700 g of spiroglycol crystals. The purified spiroglycol obtained had a nitrogen content of 18.2 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1. This copolycarbonate had lightly yellowed. COMPARATIVE EXAMPLE 3

Diacetone alcohol was used in place of methanol as a solvent for spiroglycol recrystallization. In 10 liters of diacetone alcohol was completely dissolved 800 g of spiroglycol at 90° C. This solution was cooled to room temperature to recrystallize the spiroglycol. The crystals were taken out by filtration, rinsed with an almost equivolume of diacetone alcohol, and then vacuum-dried at 80° C. to obtain 700 g of spiroglycol crystals. The purified spiroglycol obtained had a nitrogen content of 23.1 ppm. The same polymerization operation as in Example 1 was conducted, except that this purified spiroglycol was used. Thus, a bisphenol A/spiroglycol copolycarbonate was obtained. Properties of the copolycarbonate obtained are shown in Table 1. This copolycarbonate had yellowed.

The properties shown in Table 1 were determined by the following methods.

(1) Nitrogen content of the starting material: A total nitrogen analyzer (TN-10, manufactured by Mitsubishi Chemical Corp.) was used to determine the nitrogen content. The detection limit was 1.5 ppm.

(2) Molecular weight: A gel permeation chromatograph (Shodex GPC System 11) was used to determine the molecular weight of a polycarbonate (weight-average molecular weight: $M_w$) in terms of standard polystyrene. Chloroform was used as a developing solvent.

(3) Resin YI: A resin obtained was press-molded into a disk having a diameter of 40 mm and a thickness of 3 mm. The YI (yellowness index) of the disk was measured with a color difference meter (TC-1800MK2, manufactured by Tokyo Denshoku K. K.).

TABLE 1

| | Nitrogen content of spiroglycol (ppm) | Nitrogen content of polycarbonate (ppm) | $M_w$ | Resin YI |
|---|---|---|---|---|
| Example 1 | 8.5 | 3.5 | 71,000 | 3.0 |
| Example 2 | 9.1 | 3.7 | 85,000 | 3.0 |
| Example 3 | 6.8 | 2.8 | 89,500 | 2.9 |
| Example 4 | 2.6 | 1.1 | 92,000 | 2.1 |
| Example 5 | 3.1 | 1.3 | 83,000 | 1.9 |
| Example 6 | 2.9 | 1.2 | 86,000 | 2.2 |
| Comparative Example 1 | 43.5 | 17.9 | 82,000 | 15 |
| Comparative Example 2 | 18.2 | 7.5 | 85,000 | 4.0 |
| Comparative Example 3 | 23.1 | 9.5 | 89,500 | 5.2 |

EXAMPLE 7

In 10 liters of methanol was completely dissolved 800 g of commercial 3,3'-bis(2-hydroxy-1,1-dimethylethyl)-2,4,8,10-tetraoxaspiro[5.5]undecane (hereinafter referred to as spiroglycol) at 60° C. This hot solution was filtered through a PTFE membrane filter having an opening diameter of 0.1 μm (TCF010, manufactured by Advantec Toyo Co.). The solution obtained was cooled to room temperature to obtain spiroglycol crystals. The crystals were taken out by filtration, rinsed with an almost equivolume of methanol, and then dried with a vacuum dryer at 60° C. to obtain 560 g of crystals.

The purified spiroglycol obtained had an iron content of 0.2 ppm.

Into a 300 cc four-necked flask equipped with a stirrer and a distiller were introduced 22.8 g (0.10 mol) of 2,2-bis(4-hydroxyphenyl)propane, 30.4 g (0.10 mol) of the purified spiroglycol obtained above, 43.3 g (0.202 mol) of diphenyl carbonate, and $6.0 \times 10^{-7}$ mol of sodium hydrogen carbonate. In a nitrogen atmosphere, the contents were heated to 180° C. and stirred for 30 minutes.

Thereafter, the degree of vacuum was regulated to 150 mmHg and, simultaneously therewith, the reaction mixture was heated to 200° C. at a rate of 60° C./hr to conduct transesterification reactions. The reaction mixture was further heated to 260° C. and held at this temperature for 10 minutes and the internal pressure was then reduced to 1 mmHg or lower over 1 hour, while the resulting phenol was kept being distilled off. Reactions were thus conducted with stirring for 6 hours in total. After completion of the reactions, nitrogen was introduced into the reaction vessel to return the internal pressure to ordinary pressure, and the copolycarbonate yielded was taken out. Properties of this copolycarbonate are shown in Table 2.

EXAMPLE 8

In 10 liters of methanol was completely dissolved 800 g of commercial spiroglycol at 60° C. This hot solution was filtered through a filter having an opening diameter of 0.65 μm comprising a nonwoven polyester fabric coated with cellulose acetate (TCYE-HS, manufactured by Advantec Toyo Co.). The solution obtained was cooled to room temperature to obtain spiroglycol crystals. The crystals were separated from the solution with a Nutsche funnel, rinsed with an almost equivolume of methanol, and then dried with a vacuum dryer at 60° C. to obtain 560 g of spiroglycol. The purified spiroglycol obtained had an iron content of 0.5 ppm. The same polymerization operation as in Example 7 was conducted, except that this purified spiroglycol was used. Thus, a bisphenol A/spiroglycol copolycarbonate was obtained. Properties of the copolycarbonate obtained are shown in Table 2.

EXAMPLE 9

In 10 liters of 2-ethoxyethanol was completely dissolved 800 g of commercial spiroglycol at 90° C. This hot solution was filtered through a filter having an opening diameter of 0.5 μm made of SUS316L (manufactured by TFS Japan). The solution obtained was cooled to room temperature to obtain spiroglycol crystals. The crystals were separated from the solution with a Nutsche funnel, rinsed with an almost equivolume of 2-ethoxyethanol, and then dried with a vacuum dryer at 60° C. to obtain 720 g of spiroglycol. The purified spiroglycol obtained had an iron content of 0.30 ppm. The same polymerization operation as in Example 7 was conducted, except that this purified spiroglycol was used. Thus, a bisphenol A/spiroglycol copolycarbonate was obtained. Properties of the copolycarbonate obtained are shown in Table 2.

EXAMPLE 10

In 10 liters of 2-ethoxyethanol was completely dissolved 800 g of spiroglycol at 90° C. This solution was passed through a commercial activated-carbon cartridge filter (TCC-W1, manufactured by Advantec Toyo Co.) and then cooled to room temperature to recrystallize the spiroglycol. The crystals were taken out by filtration, and the resultant cake was rinsed with an almost equivolume of 2-ethoxyethanol and then dried with a vacuum dryer at 80° C. to obtain 720 g of crystals. The purified spiroglycol obtained had an iron content of 0.30 ppm. The same polymerization operation as in Example 7 was conducted, except that this purified spiroglycol was used. Thus, a bisphenol A/spiroglycol copolycarbonate was obtained. Properties of the copolycarbonate obtained are shown in Table 2.

COMPARATIVE EXAMPLE 4

The same procedure as in Example 7 was conducted, except that the commercial spiroglycol, having an iron content of 2.1 ppm, was used as it was. The copolycarbonate obtained had a very poor color tone.

COMPARATIVE EXAMPLE 5

In 10 liters of methanol was dissolved 800 g of commercial spiroglycol at 60° C. This hot solution was filtered through a wound cartridge filter having an opening diameter of 1 μm made of cotton (TCW-1, manufactured by Advantec Toyo Co.). The solution obtained was cooled to room temperature to obtain spiroglycol crystals. The crystals were separated from the solvent with a Nutsche funnel, rinsed with an almost equivolume of methanol, and then dried with a vacuum dryer at 60° C. to obtain 560 g of spiroglycol. The purified spiroglycol obtained had an iron content of 1.4 ppm; The same polymerization operation as in Example 7 was conducted, except that this spiroglycol was used. Thus, a bisphenol A/spiroglycol copolycarbonate was obtained. Properties of the copolycarbonate obtained are shown in Table 2.

The properties shown in Table 2 were determined by the same methods as described hereinabove.

TABLE 2

|  | Example 7 | Example 8 | Example 9 | Example 10 |
|---|---|---|---|---|
| Iron content, ppm | 0.2 | 0.5 | 0.3 | 0.3 |
| $M_w$ | 82000 | 85000 | 88500 | 86000 |
| Resin YI | 2.5 | 3.0 | 2.6 | 2.1 |

|  | Comparative Example 4 | Comparative Example 5 |
|---|---|---|
| Iron content, ppm | 2.1 | 1.4 |
| $M_w$ | 82000 | 85000 |
| Resin YI | 15 | 5.0 |

EXAMPLE 11

In 10 liters of isobutyl alcohol was completely dissolved 800 g of commercial 3,3'-bis (2-hydroxy-1,1-dimethylethyl)-2,4,8,10-tetraoxaspiro[5.5]undecane (hereinafter referred to as spiroglycol) at 90° C. This solution was cooled to room temperature to recrystallize the spiroglycol. The crystals were taken out by filtration, rinsed with an almost equivolume of isobutyl alcohol, and then dried with a vacuum dryer at 60° C. to obtain 700 g of spiroglycol crystals. This purified spiroglycol had an aldehyde group content of 1 ppm or lower and a formyl group content of 90 ppm.

Into a 300 cc four-necked flask equipped with a stirrer and a distiller were introduced 22.8 g (0.10 mol) of 2,2-bis(4-hydroxyphenyl)propane, 30.4 g (0.10 mol) of the purified spiroglycol obtained above, 43.3 g (0.202 mol) of diphenyl carbonate, and $6.0 \times 10^{-7}$ mol of sodium hydrogen carbonate. In a nitrogen atmosphere, the contents were heated to 180° C. and stirred for 30 minutes.

Thereafter, the degree of vacuum was regulated to 150 mmHg and, simultaneously therewith, the reaction mixture was heated to 200° C. at a rate of 60° C./hr to conduct transesterification reactions. The reaction mixture was further heated to 260° C. and held at this temperature for 10 minutes and the internal pressure was then reduced to 1 mmHg or lower over 1 hour, while the resultant phenol was kept being distilled off. Reactions were thus conducted with stirring for 6 hours in total. After completion of the reactions, nitrogen was introduced into the reaction vessel to return the internal pressure to ordinary pressure, and the copolycarbonate yielded was taken out. Properties of this copolycarbonate are shown in Table 3.

EXAMPLE 12

To 1 liter of isobutyl alcohol was added 87.5 g of commercial spiroglycol. This mixture was held at 75° C. Thereto were dropwise added, with vigorous agitation, 875 ml of 5% aqueous hydrogen peroxide solution heated to 75° C. and 0.556 g of boric acid. After completion of the addition, the mixture was held at 75° C. for 1 hour with vigorous agitation to conduct washing. The agitation was stopped and the aqueous layer was discharged. Thereafter, the organic layer was further washed by adding 375 g of ion-exchanged water thereto, vigorously agitating the mixture for 15 minutes, stopping the agitation, and then discharging the aqueous layer. This washing operation was conducted three times. The organic layer in a hot state was filtered through a filter paper (opening size, 1 μm) and then allowed to stand and cool overnight to recrystallize the spiroglycol. The crystals obtained were taken out by filtration, rinsed with an almost equivolume of isobutyl alcohol, and then vacuum-dried at 60° C. to obtain 70 g of spiroglycol crystals. The purified spiroglycol obtained had an aldehyde group content of 1 ppm or lower and a formyl group content of 30 ppm. The same polymerization operation as in Example 11 was conducted, except that this purified spiroglycol was used. Thus, a bisphenol A/spiroglycol copolycarbonate was obtained. Properties of the copolycarbonate obtained are shown in Table 3.

EXAMPLE 13

To 1 liter of isobutyl alcohol was added 87.5 g of commercial spiroglycol. This mixture was held at 75° C. Thereto was dropwise added, with vigorous agitation, 875 g of 450 ppm aqueous sodium hydrosulfite solution heated to 75° C. After completion of the addition, the mixture was held at 75° C. for 1 hour with vigorous agitation to conduct washing. The agitation was stopped and the aqueous layer was then discharged. Thereafter, the organic layer was further washed by adding 375 g of ion-exchanged water thereto, vigorously agitating the mixture for 15 minutes, stopping the agitation, and then discharging the aqueous layer. This washing operation was conducted three times. The organic layer in a hot state was filtered through a filter paper (opening size, 1 μm) and then allowed to stand and cool overnight to recrystallize the spiroglycol. The crystals obtained were taken out by filtration, rinsed with an almost equivolume of isobutyl alcohol, and then vacuum-dried at 60° C. to obtain 68 g of spiroglycol crystals. The purified spiroglycol obtained had an aldehyde group content of 1 ppm or lower and a formyl group content of 47 ppm. The same polymerization operation as in Example 11 was conducted, except that this purified spiroglycol was used. Thus, a bisphenol A/spiroglycol copolycarbonate was obtained. Properties of the copolycarbonate obtained are shown in Table 3.

EXAMPLE 14

Into a 2.1 liter autoclave were introduced 80 g of commercial spiroglycol, 1,000 g of isobutyl alcohol, and 0.4 g of activated carbon having 5% platinum supported thereon. The atmosphere in the autoclave was replaced with hydrogen and the hydrogen pressure was elevated to 20 kgf. Thereafter, the contents were heated with vigorous agitation and held at 80° C. for 1 hour. This hot mixture was filtered through a filter paper (opening size, 1 μm) to remove the catalyst, and the filtrate was allowed to stand and cool overnight to recrystallize the spiroglycol. The crystals obtained were taken out by filtration, rinsed with an almost equivolume of isobutyl alcohol, and then dried with a vacuum dryer at 60° C. to obtain 72 g of crystals. The purified spiroglycol obtained had an aldehyde group content of 1 ppm or lower and a formyl group content of 45 ppm. The same polymerization operation as in Example 11 was conducted, except that this purified spiroglycol was used. Thus, a bisphenol A/spiroglycol copolycarbonate was obtained. Properties of the copolycarbonate obtained are shown in Table 3.

COMPARATIVE EXAMPLE 6

The same procedure as in Example 11 was conducted, except that the commercial spiroglycol was used without being purified. This spiroglycol had an aldehyde group content of 25 ppm and a formyl group content of 125 ppm. The copolycarbonate obtained had a very poor color tone.

COMPARATIVE EXAMPLE 7

With 2,000 ml of ion-exchanged water was mixed 100 g of commercial spiroglycol. This slurry was vigorously agitated for 1 hour while holding the slurry at 75° C., and then filtered. The resultant cake was washed with an almost equivolume of ion-exchanged water and then dried with a vacuum dryer at 60° C. to obtain 96 g of fine crystals. The spiroglycol obtained had an aldehyde group content of 22 ppm and a formyl group content of 113 ppm. The same polymerization operation as in Example 11 was conducted, except that this purified spiroglycol was used. Thus, a bisphenol A/spiroglycol copolycarbonate was obtained. Properties of the copolycarbonate obtained are shown in Table 3. This copolycarbonate had lightly yellowed.

COMPARATIVE EXAMPLE 8

With 2,000 ml of methanol was mixed 160 g of commercial spiroglycol. This slurry was vigorously agitated for 1 hour while holding the slurry at 25° C., and then filtered. The resultant cake was washed with an almost equivolume of methanol and then dried with a vacuum dryer at 60° C. to obtain 124 g of fine crystals. The spiroglycol obtained had an aldehyde group content of 12 ppm and a formyl group content of 102 ppm. The same polymerization operation as in Example 11 was conducted, except that this purified spiroglycol was used. Thus, a bisphenol A/spiroglycol copolycarbonate was obtained. Properties of the copolycarbonate obtained are shown in Table 3. This copolycarbonate had lightly yellowed.

The properties shown in Table 3 were determined by the same methods as described hereinabove.

TABLE 3

|   | Example 11 | Example 12 | Example 13 | Example 14 |
|---|---|---|---|---|
| Aldehyde group | ≦1 ppm | ≦1 ppm | ≦1 ppm | ≦1 ppm |
| Formyl group | 90 ppm | 30 ppm | 47 ppm | 45 ppm |
| $M_w$ | 87500 | 84900 | 85300 | 91500 |
| Resin YI | 3.0 | 1.9 | 2.1 | 2.2 |

|   | Comparative Example 6 | Comparative Example 7 | Comparative Example 8 |
|---|---|---|---|
| Aldehyde group | 25 ppm | 22 ppm | 12 ppm |
| Formyl group | 125 ppm | 113 ppm | 102 ppm |
| $M_w$ | 82000 | 89300 | 85800 |
| Resin YI | 15 | 8.9 | 7.1 |

EXAMPLE 15

In 10 liters of methanol was completely dissolved 800 g of commercial 3,3'-bis(2-hydroxy-1,1-dimethylethyl)-2,4,8,10-tetraoxaspiro[5.5]undecane (hereinafter referred to as spiroglycol) at 60° C. This solution was cooled to room temperature to recrystallize the spiroglycol. The crystals were taken out by filtration, rinsed with an almost equivolume of methanol, and then dried with a vacuum dryer at 60° C. to obtain 560 g of crystals. These crystals had a free-chlorine content of 1.5 ppm.

Into a 300 cc four-necked flask equipped with a stirrer and a distiller were introduced 22.8 g (0.10 mol) of 2,2-bis(4-hydroxyphenyl)propane, 30.4 g (0.10 mol) of the purified spiroglycol obtained above, 43.3 g (0.202 mol) of diphenyl carbonate, and $6.0 \times 10^{-7}$ mol of sodium hydrogen carbonate. In a nitrogen atmosphere, the contents were heated to 180° C. and stirred for 30 minutes.

Thereafter, the degree of vacuum was regulated to 150 mmHg and, simultaneously therewith, the reaction mixture was heated to 200° C. at a rate of 60° C./hr to conduct transesterification reactions. The reaction mixture was further heated to 260° C. and held at this temperature for 10 minutes and the internal pressure was then reduced to 1 mmHg or lower over 1 hour, while the resultant phenol was kept being distilled off. Reactions were thus conducted with stirring for 6 hours in total. After completion of the reactions, nitrogen was introduced into the reaction vessel to return the internal pressure to ordinary pressure, and the copolycarbonate yielded was taken out. Properties of this copolycarbonate are shown in Table 4.

EXAMPLE 16

Isobutanol was used in place of methanol as a solvent for spiroglycol recrystallization. In 10 liters of isobutanol was completely dissolved 800 g of spiroglycol at 90° C. This solution was cooled to room temperature to recrystallize the spiroglycol. The crystals were taken out by filtration, rinsed with an almost equivolume of isobutanol, and then vacuum-dried at 80° C. to obtain 700 g of spiroglycol crystals. The purified spiroglycol obtained had a free-chlorine content of 2.1 ppm. The same polymerization operation as in Example 15 was conducted, except that this purified spiroglycol was used. Thus, a bisphenol A/spiroglycol copolycarbonate was obtained. Properties of the copolycarbonate obtained are shown in Table 4.

EXAMPLE 17

2-Ethoxyethanol was used in place of methanol as a solvent for spiroglycol recrystallization. In 10 liters of 2-ethoxyethanol was completely dissolved 800 g of spiroglycol at 90° C. This solution was cooled to room temperature to recrystallize the spiroglycol. The crystals were taken out by filtration, rinsed with an almost equivolume of 2-ethoxyethanol, and then vacuum-dried at 80° C. to obtain 720 g of spiroglycol crystals. The purified spiroglycol obtained had a free-chlorine content of 1.2 ppm. The same polymerization operation as in Example 15 was conducted, except that this purified spiroglycol was used. Thus, a bisphenol A/spiroglycol copolycarbonate was obtained. Properties of the copolycarbonate obtained are shown in Table 4.

EXAMPLE 18

In a mixture of 10 liters of isobutyl alcohol and 8.75 kg of water was completely dissolved 875 g of commercial spiroglycol with stirring at 75° C. This mixture was stirred at 75° C. for 1 hour and the stirring was then stopped, upon which the mixture separated into two layers. The aqueous layer was discharged in an amount of 6.78 kg. To the residue was added 3.75 kg of 75° C. water. This mixture was stirred for 15 minutes and the stirring was then stopped, upon which it separated into two layers. The aqueous layer was discharged in an amount of 4.03 kg. To the residue was added 3.75 kg of 75° C. water. This mixture was stirred for 15 minutes and the stirring was then stopped, upon which it separated into two layers. The aqueous layer was discharged in an amount of 4.12 kg. Furthermore, 3.75 kg of 75° C. water was added to the residue. This mixture was stirred for 15 minutes and the stirring was then stopped, upon which it separated into two layers. The aqueous layer was discharged, which amounted to 4.13 kg. The residual organic layer was filtered through a 5C filter paper and then cooled to room temperature to recrystallize the spiroglycol. The crystals were separated from the solution with a Nutsche funnel, rinsed with 1 liter of isobutyl alcohol, and then vacuum-dried in a vacuum dryer at 60° C. to obtain 701 g of purified spiroglycol. The spiroglycol obtained had a free-chlorine content of 0.5 ppm or lower. The same polymerization operation as in Example 15 was conducted, except that this purified spiroglycol was used. Thus, a bisphenol A/spiroglycol copolycarbonate was obtained. Properties of the copolycarbonate obtained are shown in Table 4.

COMPARATIVE EXAMPLE 9

The same procedure as in Example 15 was conducted, except that the commercial spiroglycol was used without being purified. This spiroglycol had a free-chlorine content of 23.8 ppm. The copolycarbonate obtained had a very poor color tone.

The properties shown in Table 4 were determined by the same methods as described hereinabove.

TABLE 4

| | Example 15 | Example 16 | Example 17 | Example 18 | Comparative Example 9 |
| --- | --- | --- | --- | --- | --- |
| Free chlorine (ppm) | 1.5 | 2.1 | 1.2 | ≦0.5 | 23.8 |
| $M_w$ | 71000 | 85000 | 89500 | 86000 | 82000 |
| Resin YI | 3.0 | 3.0 | 2.9 | 2.4 | 15 |

EXAMPLE 19

In 10 liters of methanol was completely dissolved 800 g of commercial 3,3'-bis(2-hydroxy-1,1-dimethylethyl)-2,4,8,10-tetraoxaspiro[5.5]undecane (hereinafter referred to as spiroglycol) at 60° C. This solution was cooled to room temperature to recrystallize the spiroglycol. The crystals were taken out by filtration, rinsed with an almost equivolume of methanol, and then dried with a vacuum dryer at 60° C. to obtain 560 g of crystals. These crystals had a melt Hazen unit of 35 after having been held at 260° C. for 5 hours in the air.

Into a 300-cc four-necked flask equipped with a stirrer and a distiller were introduced 22.8 g (0.10 mol) of 2,2-bis(4-hydroxyphenyl)propane, 30.4 g (0.10 mol) of the purified spiroglycol obtained above, 43.3 g (0.202 mol) of diphenyl carbonate, and $6.0 \times 10^{-7}$ mol of sodium hydrogen carbonate. In a nitrogen atmosphere, the contents were heated to 180° C. and stirred for 30 minutes.

Thereafter, the degree of vacuum was regulated to 150 mmHg and, simultaneously therewith, the reaction mixture was heated to 200° C. at a rate of 60 ° C./hr to conduct transesterification reactions. The reaction mixture was further heated to 260° C. and held at this temperature for 10 minutes and the internal pressure was then reduced to 1 mmHg or lower over 1 hour, while the resulting phenol was maintained being distilled off. Reactions were thus conducted with stirring for 6 hours in total. After completion of the reactions, nitrogen was introduced into the reaction vessel to return the internal pressure to ordinary pressure, and the copolycarbonate yielded was taken out. Properties of this copolycarbonate are shown in Table 5.

EXAMPLE 20

Isobutanol was used in place of methanol as a solvent for spiroglycol recrystallization. In 10 liters of isobutanol was completely dissolved 800 g of spiroglycol at 90° C. This solution was cooled to room temperature to recrystallize the spiroglycol. The crystals were taken out by filtration, rinsed with an almost equivolume of isobutanol, and then vacuum-dried at 80° C. to obtain 700 g of spiroglycol crystals. The purified spiroglycol obtained had a melt Hazen unit of 35 after having been held at 260° C. for 5 hours in the air. The same polymerization operation as in Example 19 was conducted, except that this purified spiroglycol was used. Thus, a bisphenol A/spiroglycol copolycarbonate was obtained. Properties of the copolycarbonate obtained are shown in Table 5.

EXAMPLE 21

2-Ethoxyethanol was used in place of methanol as a solvent for spiroglycol recrystallization. In 10 liters of 2-ethoxyethanol was completely dissolved 800 g of spiroglycol at 90° C. This solution was cooled to room temperature to recrystallize the spiroglycol. The crystals were taken out by filtration, rinsed with an almost equivolume of 2-ethoxyethanol, and then vacuum-dried at 80° C. to obtain 720 g of spiroglycol crystals. The purified spiroglycol obtained had a melt Hazen unit of 30 after having been held at 260° C. for 5 hours in the air. The same polymerization operation as in Example 19 was conducted, except that this purified spiroglycol was used. Thus, a bisphenol A/spiroglycol copolycarbonate was obtained. Properties of the copolycarbonate obtained are shown in Table 5.

EXAMPLE 22

In 10 liters of 2-ethoxyethanol was completely dissolved 800 g of spiroglycol at 90° C. This solution was passed through a commercial activated-carbon cartridge filter (TCC-W1, manufactured by Advantec Toyo Co.) and then cooled to room temperature to recrystallize the spiroglycol. The crystals were taken out by filtration, and the resultant cake was rinsed with an almost equivolume of 2-ethoxyethanol and then dried with a vacuum dryer at 80° C. to obtain 720 g of crystals. The purified spiroglycol obtained had a melt Hazen unit of 15 after having been held at 260° C. for 5 hours in the air. The same polymerization operation as in Example 19 was conducted, except that this purified spiroglycol was used. Thus, a bisphenol A/spiroglycol copolycarbonate was obtained. Properties of the copolycarbonate obtained are shown in Table 5.

COMPARATIVE EXAMPLE 10

The same procedure as in Example 19 was conducted, except that the commercial spiroglycol was used without being purified. This spiroglycol had a melt Hazen unit of 150 after having been held at 260° C. for 5 hours in the air. The copolycarbonate obtained had a very poor color tone.

COMPARATIVE EXAMPLE 11

2-Ethoxyethyl acetate was used in place of methanol as a solvent for spiroglycol recrystallization. In 10 liters of 2-ethoxyethyl acetate was completely dissolved 800 g of spiroglycol at 90° C. This solution was cooled to room temperature to recrystallize the spiroglycol. The crystals were taken out by filtration, rinsed with an almost equivolume of 2-ethoxyethyl acetate, and then vacuum-dried at 80° C. to obtain 700 g of spiroglycol crystals. The purified spiroglycol obtained had a melt Hazen unit of 50 after having been held at 260° C. for 5 hours in the air. The same polymerization operation as in Example 19 was conducted, except that this purified spiroglycol was used. Thus, a bisphenol A/spiroglycol copolycarbonate was obtained. Properties of the copolycarbonate obtained are shown in Table 5. This copolycarbonate had lightly yellowed.

COMPARATIVE EXAMPLE 12

Diacetone alcohol was used in place of methanol as a solvent for spiroglycol recrystallization. In 10 liters of diacetone alcohol was completely dissolved 800 g of spiroglycol at 90° C. This solution was cooled to room temperature to recrystallize the spiroglycol. The crystals were taken out by filtration, rinsed with an almost equivolume of diacetone alcohol, and then vacuum-dried at 80° C. to obtain 700 g of spiroglycol crystals. The purified spiroglycol obtained had a melt Hazen unit of 60 after having been maintained at 260° C. for 5 hours in the air. The same polymerization operation as in Example 19 was conducted, except that this purified spiroglycol was used. Thus, a bisphenol A/spiroglycol copolycarbonate was obtained. Properties of the copolycarbonate obtained are shown in Table 5. This copolycarbonate had yellowed.

The properties shown in Table 5 were determined by the same methods as described hereinabove.

TABLE 5

|  | Example 19 | Example 20 | Example 21 | Example 22 |
|---|---|---|---|---|
| Starting material APHA | 35 | 35 | 30 | 15 |
| $M_w$ | 71000 | 85000 | 89500 | 92000 |
| Resin YI | 3.0 | 3.0 | 2.9 | 2.1 |

|  | Comparative Example 10 | Comparative Example 11 | Comparative Example 12 |
|---|---|---|---|
| Starting material APHA | 150 | 50 | 60 |
| $M_w$ | 82000 | 85000 | 89500 |
| Resin YI | 15 | 4.0 | 5.2 |

While the invention has been described in detail and with reference to specific embodiments thereof, it will be apparent to one skilled in the art that various changes and modifications can be made therein without departing from the spirit and scope thereof.

What is claimed is:

1. A process for producing an aromatic/aliphatic copolycarbonate having a nitrogen content of 9 ppm or lower, which comprises subjecting an aromatic dihydroxy compound represented by the following formula (1), an aliphatic dihydroxy compound represented by the following formula (2), and a carbonic diester to polycondensation under heating and melting, wherein the aliphatic dihydroxy compound having a nitrogen content of 10 ppm or lower is used:

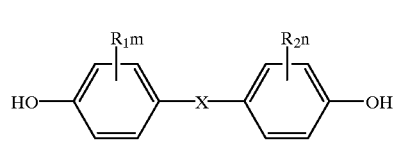

(wherein X is

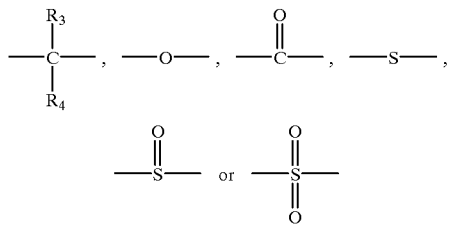

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and wherein m and n indicate the number of substituent $R_1$ and $R_2$ groups, respectively, and each of m and n is an integer in the range of 0 to 4);

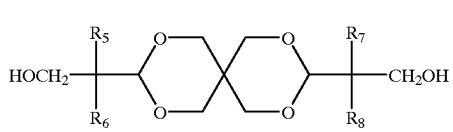

(wherein $R_5$, $R_6$, $R_7$, and $R_8$ each is a hydrogen atom or a univalent alkyl group having 1 to 10 carbon atoms).

2. The process for producing an aromatic/aliphatic copolycarbonate of claim 1, wherein the aliphatic dihydroxy compound is 3,9-bis(2-hydroxy-1,1-dimethylethyl)-2,4,8,10-tetraoxaspiro[5.5]undecane.

3. The process for producing an aromatic/aliphatic copolycarbonate of claim 1, wherein the aliphatic dihydroxy compound having a nitrogen content of 10 ppm or lower is one obtained by the recrystallization method.

4. The process for producing an aromatic/aliphatic copolycarbonate of claim 3, wherein the recrystallization is conducted using a solvent which is an alcohol having 1 to 10 carbon atoms.

5. The process for producing an aromatic/aliphatic copolycarbonate of claim 3, wherein the recrystallization operation comprises a step in which the solvent containing the aliphatic dihydroxy compound dissolved therein is brought into contact with an adsorbent.

6. The process for producing an aromatic/aliphatic copolycarbonate of claim 5, wherein the adsorbent is activated carbon.

7. The process for producing an aromatic/aliphatic copolycarbonate of claim 3, wherein the recrystallization operation comprises a step in which the solvent for recrystallization containing the aliphatic dihydroxy compound dissolved therein is washed with water with heating.

8. The process for producing an aromatic/aliphatic copolycarbonate of claim 7, wherein the organic solvent for recrystallization is an organic solvent which separates from water after having been mixed therewith.

9. A process for producing an aromatic/aliphatic copolycarbonate which comprises subjecting an aromatic dihydroxy compound represented by the following formula (1), an aliphatic dihydroxy compound represented by the following formula (2), and a carbonic diester to polycondensation under heating and melting, wherein aliphatic dihydroxy compound having an iron content of 1 ppm or lower is used:

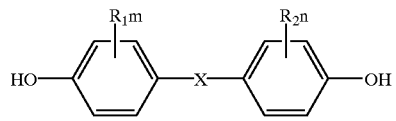
(1)

(wherein X is

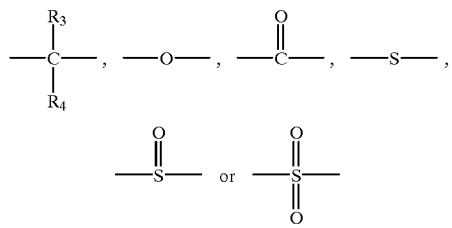

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and wherein m and n indicate the number of substituent $R_1$ and $R_2$ groups, respectively, and each of m and n is an integer in the range of 0 to 4);

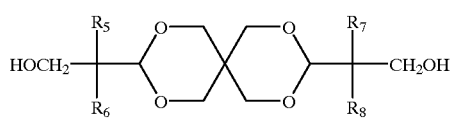
(2)

(wherein $R_5$, $R_6$, $R_7$, and $R_8$ each is a hydrogen atom or a univalent alkyl group having 1 to 10 carbon atoms).

10. The process for producing an aromatic/aliphatic copolycarbonate of claim 9, wherein the aliphatic dihydroxy compound is 3,9-bis(2-hydroxy-1,1-dimethylethyl)-2,4,8,10-tetraoxaspiro[5.5]undecane.

11. The process for producing an aromatic/aliphatic copolycarbonate of claim 9, wherein the aliphatic dihydroxy compound is one obtained by purifying a crude aliphatic dihydroxy compound by dissolving the same in a solvent with heating, filtering the solution in a hot state, and recrystallizing the dissolved compound from the filtrate.

12. The process for producing an aromatic/aliphatic copolycarbonate of claim 11, wherein the solvent used for the recrystallization is an alcohol having 1 to 10 carbon atoms.

13. A process for producing an aromatic/aliphatic copolycarbonate which comprises subjecting an aromatic dihydroxy compound represented by the following formula (1), an aliphatic dihydroxy compound represented by the following formula (2), and a carbonic diester to polycondensation under heating and melting, wherein the aliphatic dihydroxy compound having a content of aldehyde groups and/or formyl groups of 100 ppm or lower is used:

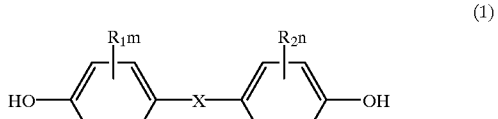
(1)

(wherein X is

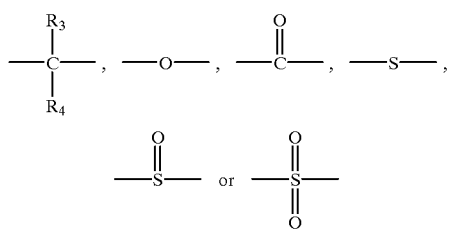

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and wherein m and n indicate the number of substituent $R_1$ and $R_2$ groups, respectively, and each of m and n is an integer in the range of 0 to 4);

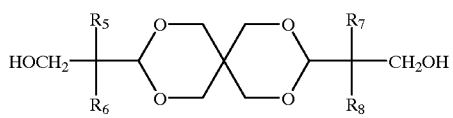
(2)

(wherein $R_5$, $R_6$, $R_7$, and $R_8$ each is a hydrogen atom or a univalent alkyl group having 1 to 10 carbon atoms).

14. The process for producing an aromatic/aliphatic copolycarbonate of claim 13, wherein the aliphatic dihydroxy compound is 3,9-bis(2-hydroxy-1,1-dimethylethyl)-2,4,8,10-tetraoxaspiro[5.5]undecane.

15. A process for producing an aromatic/aliphatic copolycarbonate which comprises subjecting an aromatic dihydroxy compound represented by the following formula (1), an aliphatic dihydroxy compound represented by the following formula (2), and a carbonic diester to polycondensation with heating and melting, wherein the aliphatic dihydroxy compound having a content of free chlorine of 5 ppm or lower is used:

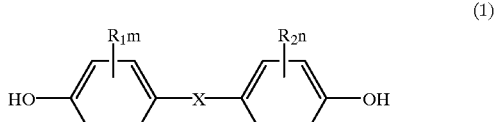
(1)

(wherein X is

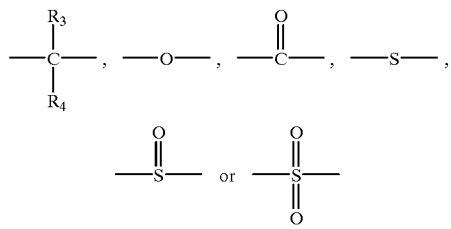

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and wherein m and n indicate the number of substituent $R_1$ and $R_2$ groups, respectively, and each of m and n is an integer in the range of 0 to 4);

(2)

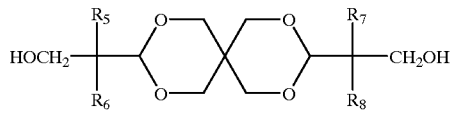

(wherein $R_5$, $R_6$, $R_7$, and $R_8$ each is a hydrogen atom or a univalent alkyl group having 1 to 10 carbon atoms).

16. The process for producing an aromatic/aliphatic copolycarbonate of claim 15, wherein the aliphatic dihydroxy compound is 3,9-bis(2-hydroxy-1,1-dimethylethyl)-2,4,8,10-tetraoxaspiro[5.5]undecane.

17. The process for producing an aromatic/aliphatic copolycarbonate of claim 15, wherein the aliphatic dihydroxy compound is one which has been purified by recrystallization.

18. The process for producing an aromatic/aliphatic copolycarbonate of claim 17, wherein the recrystallization is conducted using a solvent which is an alcohol having 1 to 10 carbon atoms.

19. The process for producing an aromatic/aliphatic copolycarbonate of claim 17, wherein the recrystallization operation comprises a step in which the solvent for recrystallization containing the aliphatic dihydroxy compound dissolved therein is washed with water with heating.

20. The process for producing an aromatic/aliphatic copolycarbonate of claim 19, wherein the organic solvent for recrystallization is an organic solvent which separates from water after having been mixed therewith.

21. A process for producing an aromatic/aliphatic copolycarbonae which comprises subjecting an aromatic dihydroxy compound represented by the following formula (1), an aliphatic dihydroxy compound represented by the following formula (2), and carbonic diester to polycondensation with heating an melting, wherein the aliphatic dihydroxy compound having a melt Hazen unit of 40 or smaller after having been maintained at 260° C. for 5 hours in the air is used:

(1)

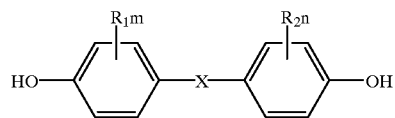

(wherein X is

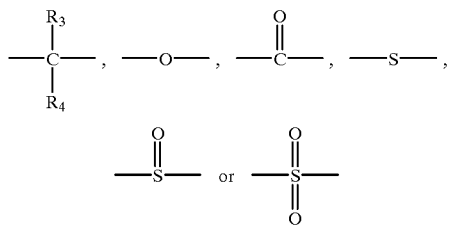

wherein $R_3$ and $R_4$ each is a hydrogen atom, an alkyl group having 1 to 10 carbon atoms, or a phenyl group, or $R_3$ and $R_4$ may be bonded to each other to form a ring; $R_1$ and $R_2$ may be the same or different and each is a hydrogen atom, an alkyl group having 1 to 10 carbon atoms, or a halogen atom; and wherein m and n indicate the number of substituent $R_1$ and $R_2$ groups, respectively, and each of m and n is an integer in the range of 0 to 4);

(2)

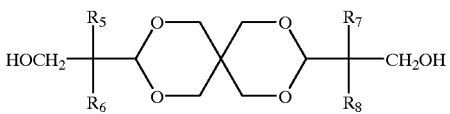

(wherein $R_5$, $R_6$, $R_7$ and $R_8$ each is a hydrogen atom or a univalent alkyl group having 1 to 10 carbon atoms).

22. The process for producing an aromatic/aliphatic copolycarbonate of claim 21, wherein the aliphatic dihydroxy compound is 3,9-bis(2-hydroxy-1,1-dimethylethyl)-2,4,8,10-tetraoxaspiro[5.5]undecane.

23. The process for producing an aromatic/aliphatic copolycarbonate of claim 21, wherein the aliphatic dihydroxy compound is one obtained by purifying a crude aliphatic dihydroxy compound by recrystallization.

24. The process for producing an aromatic/aliphatic copolycarbonate of claim 23, wherein the recrystallization is conducted using a solvent which is an alcohol having 1 to 10 carbon atoms.

25. The process for producing an aromatic/aliphatic copolycarbonate of claim 23, wherein the recrystallization operation comprises a step in which the solvent containing the aliphatic dihydroxy compound dissolved therein is brought into contact with an adsorbent.

26. The process for producing an aromatic/aliphatic copolycarbonate of claim 25, wherein the adsorbent is activated carbon.

* * * * *